United States Patent [19]

Okada et al.

[11] Patent Number: 5,294,666
[45] Date of Patent: Mar. 15, 1994

[54] POLYMER FOR OPTICAL PRODUCTS AND PROCESS FOR PREPARATION THEREOF

[75] Inventors: Reisuke Okada, Hinodemachi; Tsuyoshi Ohkubo, Hachioji; Masahisa Kosaka, Hinodemachi, all of Japan

[73] Assignee: Hoya Corporation, Tokyo, Japan

[21] Appl. No.: 936,302

[22] Filed: Aug. 28, 1992

[30] Foreign Application Priority Data

Sep. 3, 1991 [JP] Japan ................... 3-250494

[51] Int. Cl.$^5$ ............................................. C08J 3/00
[52] U.S. Cl. ...................... 524/609; 528/76; 528/77; 528/78
[58] Field of Search ............... 524/609; 528/76, 77, 528/78

[56] References Cited

U.S. PATENT DOCUMENTS

| | | | |
|---|---|---|---|
| 2,900,392 | 8/1959 | Remes | 260/327 |
| 5,084,545 | 6/1992 | Nagata et al. | 528/76 |

FOREIGN PATENT DOCUMENTS

| | | |
|---|---|---|
| 0435306A2 | 7/1991 | European Pat. Off. |
| 63-046213 | 2/1988 | Japan |
| 1-026622 | 1/1989 | Japan |
| 2-59570 | 2/1990 | Japan |

*Primary Examiner*—Paul R. Michl
*Assistant Examiner*—Edward Cain

*Attorney, Agent, or Firm*—Burns, Doane, Swecker and Mathis

[57] ABSTRACT

A polymer used for optical products wherein the polymer comprises 2,5-dimethyl-1,4-dithiane skeletons represented by formula (1):

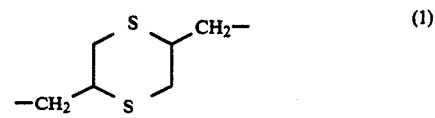

and 1,3,5-trimethylcyclohexane skeletons represented by formula (2):

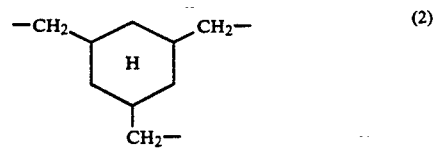

and a part of or all of bonds between the 2,5-dimethyl-1,4-dithiane skeleton and the 1,3,5-trimethylcyclohexane skeleton are thiourethane bonds. The polymer exhibits 1.63 or more of refractive index, 35 or more of Abbe's number and 100° C. or more of second-order transition point. The polymer is prepared by polyaddition of 2,5-dimercaptomethyl-1,4-dithiane and 1,3,5-triisocyanatomethylcyclohexane.

20 Claims, 1 Drawing Sheet

POLYMER FOR OPTICAL PRODUCTS AND PROCESS FOR PREPARATION THEREOF

BACKGROUND OF THE INVENTION

Field of the Invention

The present invention relates to a polymer used for optical products having, as the major skeletons, 2,5-dimethyl-1,4-dithiane skeletons and 1,3,5-trimethylcyclohexane skeletons. The polymer of the present invention has advantageous optical characteristics since it exhibits both of high refractive index and low dispersion. Thus the polymer is a suitable material for optical products such as a lens for eye glasses, an optical lens, a prism, an optical fiber and a substrate for recording information.

Description of the Related Art

Since plastics are light, hard to be broken and easy to be dyed in comparison with glasses, they are used for optical products such as eye glasses. Polyethyleneglycol bisallylcarbonate (CR-39) and polymethylmethacrylate (PMMA) are generally used as the plastic materials. However, refractive indexes of the plastic materials are 1.50 or less and small. Thus when the materials are used for strong glasses, the thickness of the glasses are necessarily increased and the superiority of the plastics over glasses would be decreased. In addition, an appearance of the thick eye glasses would be bad. Therefore, plastic materials for optical products are strongly required to exhibit high refractive index and low dispersion (with less chromatic aberration), and enable to maintain low specific gravity of plastics and provide a relatively thin lens. A plastic material using polythiol containing dithiane rings is known as a plastic material with high refractive index and low dispersion (see 59th Vernal conference (1990) of JAPAN CHEMICAL SOCIETY, Preprints p539).

2,5-dimercaptomethyl-1,4-dithiane is used as the polythiol in the above plastic material, and the material is a polymer of the polythiol and m-xylylene diisocyanate. This polymer has relatively high refractive index of 1.661. However, the Abbe's number of the polymer is 32.3 which is higher than those of the conventional products but is still insufficient.

Desired materials are those having high refractive index and low dispersion, and in detail, materials with 1.63 or more of refractive index and 35 or more of Abbe's number, an indication of dispersion, are desirable to be provided.

An object of the present invention is to provide a novel polymer with 1.63 or more of refractive index and 35 or more of Abbe's number.

SUMMARY OF THE INVENTION

The present invention relates to a polymer used for optical products wherein the polymer comprises 2,5-dimethyl-1,4-dithiane skeletons represented by formula(1):

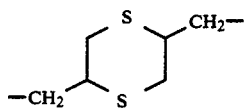

and 1,3,5-trimethylcyclohexane skeletons represented by formula (2):

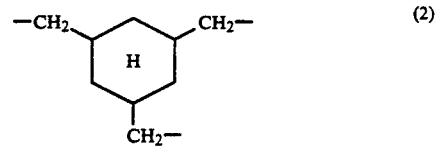

and a part of or all of bonds between the 2,5-dimethyl-1,4-dithiane skeleton and the 1,3,5-trimethylcyclohexane skeleton are thiourethane bonds.

Further, the present invention relates to a polymer used for optical products wherein the polymer exhibits 1.63 or more of refractive index, 35 or more of Abbe's number and 100° C. or more of second-order transition point.

In addition, the present invention relates to a process for preparation of a polymer used for optical products comprising polyaddition of 2,5-dimercaptomethyl-1,4-dithiane and 1,3,5-triisocyanatomethylcyclohexane.

DETAILED DESCRIPTION OF THE INVENTION

Figure 1:
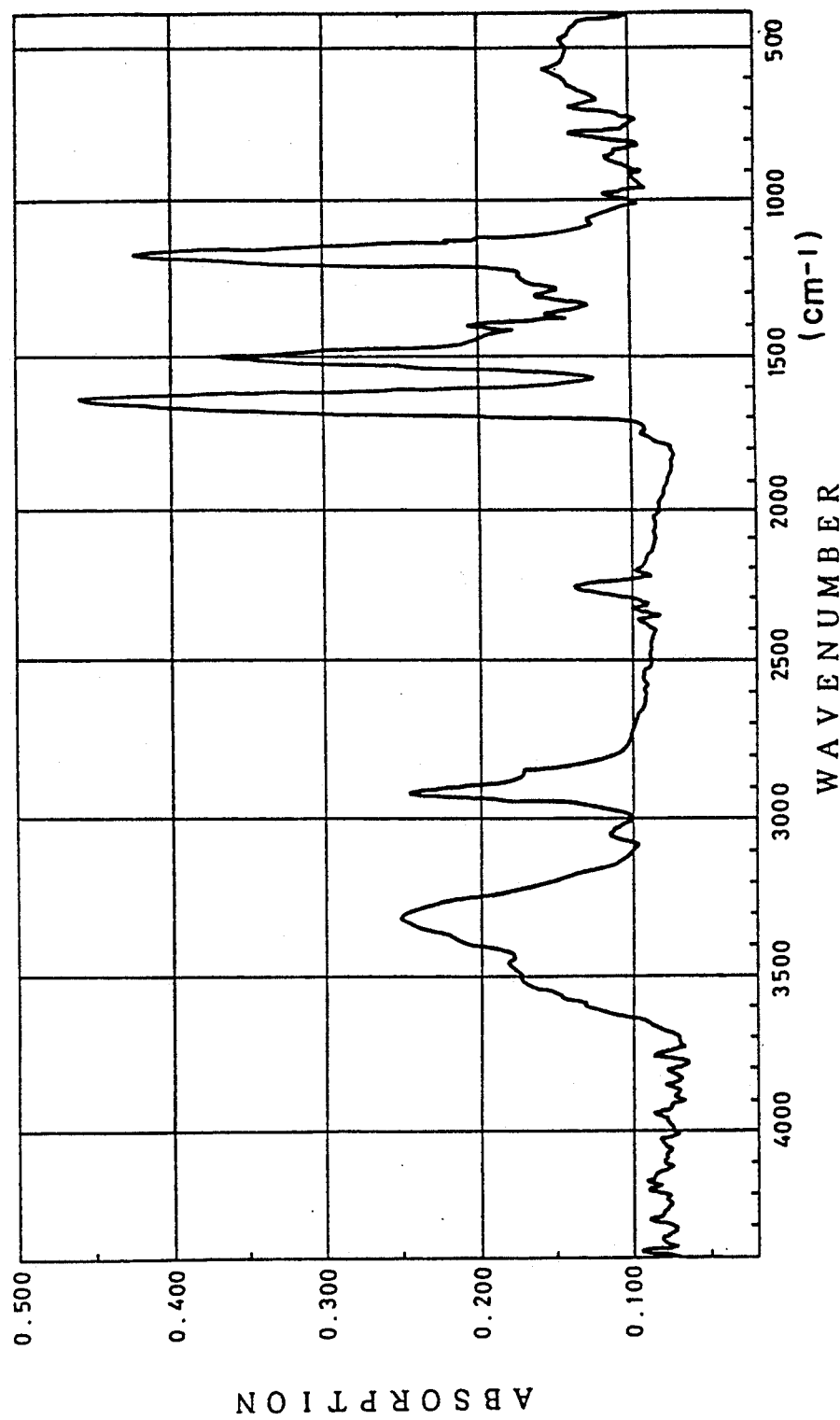
FIG. 1 illustrates the IR spectrum of the polymer of Example 1.

The polymer of the present invention comprises the 2,5-dimethyl-1,4-dithiane skeletons represented by formula (1) (hereinafter referred to skeletons (1)) and 1,3,5-trimethylcyclohexane skeletons represented by formula (2) (hereinafter referred to skeletons (2)). The polymer either consists of the above two kinds of skeletons or further comprises one or more kind of other skeletons (hereinafter may be referred to sub-skeletons). The molar ratio of skeletons (1)/skeletons (2) is preferably around 3/2, and suitably ranges from 3.2/2 to 2.8/2 from the viewpoint that the remaining amount of functional groups is minimized.

In the polymer of the present invention, a part of or all of skeletons (1) and skeletons (2) are linkaged with thiourethane bonds. The polymer is basically a polyaddition product with the following chemical structure represented by formula (3):

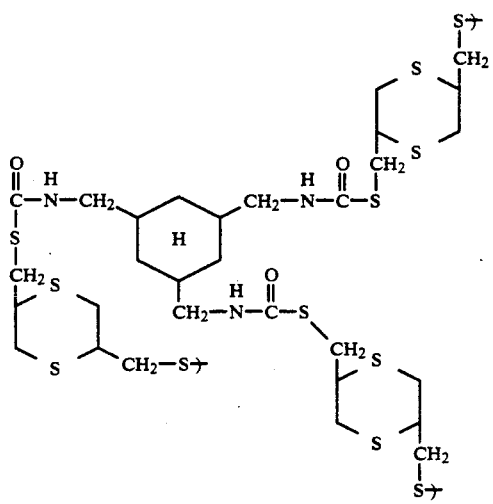

the thiourethane bonds in the polymer of the invention are identified from the absorption at about 3300 cm$^{-1}$, 1000–1100 cm$^{-1}$, 1650–1680 cm$^{-1}$ and 1200–1280 cm$^{-1}$ based on thiourethane bonds in an infrared absorption spectrum. Further, when the polymer contains urethane bonds, the urethane bonds are identified from the shift of the infrared absorption spectrum.

The existence of the 2,5-dimethyl-1,4-dithiane skeletons (1) and 1,3,5-trimethylcyclohexane skeletons (2) is identified by the solid NMR analysis.

The sub-skeletons are formed from bifunctional or trifunctional compounds with isocyanate, mercapto or hydroxyl groups. Examples of such compounds are disclosed later. The sub-skeletons are introduced into the polymer in order to improve the thermal, mechanical and/or optical properties of the polymer.

Sub-skeletons derived from compounds with isocyanate groups may be contained in the polymer 50 mole % or less of the total isocyanate component. Sub-skeletons derived from compounds with mercapto or hydroxyl groups may be contained in the polymer 50 mole % or less of the total thiol and alcohol component.

Linkages between the sub-skeletons and skeletons (1) or (2) is either thiourethane bonds or urethane bonds according to the kind of functional groups of the sub-skeletons.

The polymer of the present invention is basically polythiourethane derived from the reaction between a mercapto group and an isocyanate group, and exhibits rather excellent optical properties than the conventional ones. Further the thermal and mechanical properties are also excellent. The polymer consisting of 1,3,5-trimethyl-cyclohexane skeleton (2) and 2,5-dimethyl-1,4-dithiane skeletons (1) in the molar ratio of 2:3 (skeletons (2): skeletons (1)) has 1.63 of refractive index ($N_D$), 40 of Abbe's number ($\nu_D$), and 140° C. of second-order transition point. The thermal properties of this polymer is also good. No polymer with such good optical and thermal properties has been known.

The polymer of the present invention either consists of 1,3,5-trimethylcyclohexane skeletons (2) and 2,5-dimethyl-1,4-dithiane (1) or further comprises the sub-skeletons, and exhibits 1.63 or more of refractive index ($N_D$), 35 or more, preferably 36 or more of Abbe's number and 100° C. or more, preferably 110° C. or more of second-order transition point. The second-order transition point of the polymer is measured by the thermomechanical analysis aparatus TMA.

One reason why the polymer of the invention exhibits the excellent optical, mechanical and thermal properties may be that 2,5-dimethyl-1,4-dithiane skeletons (1) do not have any aromatic ring but have a cyclic sulfide structure and therefore, skeletons (1) exhibit high refractive index and low dispersion, and that 1,3,5-trimethylcyclohexane skeletons (2) do not have any aromatic ring and therefore, skeletons (2) exhibit relatively high refractive index and low dispersion.

In general, polyaddition of bifunctional thiols or alcohols with bifunctional diisocyanates gives a linear polymer, and the linear polymers is reacted with a crosslinking agent (the third component) such as polyfuctional thiols, alcohols or isocyanates to obtain a crosslinked polymer. However, the polymer made of a lot of components unadvantageously tends to include stiae. On the other hand, in the invention, a polyaddition product with crosslinking structure is obtained from two components because 1,3,5-triisocyanatomethylcyclohexane, a starting compound, is a trifunctional one. That is, the present invention is characterized in that a crossliked polymer is obtained directly since a bifunctional dithiol and a trifunctional triisocyanate are polymerized by polyaddition reaction.

A process for preparation of the polymer of the present invention will be set forth below:

2 5-dimercaptomethyl-1,4-dithiane the first component and 1,3,5-triisocyanatomethylcyclohexane, the second component are mixed in the same equivalent weight with respect to functinal groups, that is, in the molar ratio of about 3:2. Further, a catalyst, for example, an orgnic tin compound such as dimethyl tin dichloride, dibutyl tin dilaurate, dibutyl tin dichloride, azobisdimethylvaleronitrile or the like may be added to the above mixture in the amount of 0.001 to 0.05 mole %, preferably 0.005 to 0.02 mole % to the total mixture of the above starting compounds. The resulting mixture containing the catalyst is mixed thoroughly by agitation. Thus resulted mixture is heated gradually, for example, from about 40° C. to about 120° C. to complete polyaddition reaction. The heating period for the polyaddition reaction (for example, from 40° to 120° C.) suitably ranges from 12 to 48 hours. The highest temperature and the heating period are optionally chosen based on the kind of the compound for the sub-skeletons and amount thereof.

2,5-dimercaptomethyl-1,4-dithiane used in the invention is a novel compound and is derived from diallylsulfide as shown in the reference example. A polyaddition product obtained from 2,5-dimercaptomethyl-1,4-dithiane has high refractive index and Abbe's number, and has good thermostability and mechanical properties since rigid 1,4-dithiane rings are introduced into a backbone chain. The polyaddition product also have good weatherability.

Another starting compound, 1,3,5-triisocyanatomethylcyclohexane is a known trifunctional isocyanate disclosed in Japanese Patent Publication(JP-B) 15066/1987, EP Publication NO. 21067 and U.S. Pat. No. 4,338,256.

As mentioned above, various properties of the polymer of the present invention are improved by addition of the sub-skeletons. For instance, when high impact properties should be improved even refractive index would be affected, when refractive index should be improved even Abbe's number would be affected, when second-oerder transition point should be lowered to improve dyeing properties or in the case contrary to the above cases, the use of the sub-skeletons is effective.

However, it is necessary to maintain the excellent properties of the polymer of the invention, the amount of 2,5-dimercaptomethyl-1,4-dithiane should be 50 mole % or more of the total amount of thiols and alcohols (hereinafter abbreviated as (thi)ols) and the amount of 1,3,5-triisocyanatomethylcyclohexane should be 50 mole % or more of the total isocyanates.

It is not easy to classify clearly the compounds used for the sub-skeletons into groups with respect to characteristics because some sub-skeletons improve two or more properties. The following examples are outline of the classified groups for the sub-skeletons.

Examples of the (thi)ol compounds used for improvement of thermal and mechanical properties include the following compounds: ethyleneglycol, heopentylglycol, pentaerythritol, trimethylolpropane, glycerine, 1,2-ethanediol, 1,6-hexanediol, 1,2,3-propanetrithiol, propanetris(2-mercaptoacetate), 1,3-propanedithiol, tetrakis(mercaptomethyl)methane, pentaerythritol tetrakis(2-mercaptoacetate), pentaerythritol tetrakis(2-mercaptopropionate), tetrakis(2-mercaptoethylthiomethyl)propane, 2-mercaptoethanol, 2,3-dimercaptopropanol, 3-mercapto-1,2-propandiol, di(2-hydroxyethyl)sulfide, di(2-mercaptoethyl)sulfide and bis(2-hydroxyethyl)disulfide. The amount of the monomer suitably ranges from 0 to 20 mole % of the total (thi)ol compounds.

Examples of the (thi)ol compounds used for improvement of optical properties include the following compounds: tris(hydroxymethyl)isocyanurate, tris(2-hydroxyethyl) isocyanurate), tris(mercaptomethyl)isocyanurate, 1,4-dimercaptocyclohexane, bisphenol A, tetrabromobisphenol A, bisphenol F, 4-mercaptophenol, 1,2-benzenedithiol, 1,3-benzenedithiol, 1,4-benzenedithiol, 1,3,5-benzenetrithiol, 1,2-dimercaptomethylbenzene, 1,3-dimercaptomethylbenzene, 1,4 dimercaptomethylbenzene, 1,3,5-trimercaptomethylbenzene, cyclohexanediol, 4,4'-dihydroxyphenylsulfide, bismercaptoethylsulfide, 2,5-dihydroxy-1,4-dithiane, 2,5-dihydroxymethyl-1,4-dithiane, 1,2-bis {(2-mercaptoethyl)thio}-3-mercaptopropane, 1,2-bis(mercaptomethylthio) ethane and tetrakis(mercaptoethylthiomethyl)methane. The amount of the monomer suitably ranges from 0 to 50 mole % of the total (thi)ol compounds.

Examples of the isocyanate compounds used for improvement of thermal and mechanical properties include the following compounds: 1,2-diisocyanatoethane, 1,3-diisocyanatopropane, 1,4-diisocyanatobutane, 1,2-bis(isocyanatomethyl)cyclohexane, 1,3-diisocyanatocyclohexane, 1,4-diisocyanatocyclohexane, 1,3-bis(isocyanatomethyl)cyclohexane, 1,4-bis(isocyanatomethyl) cyclohexane, bis(4 -isocyanatocyclohexyl)methane. The amount of the monomer suitably ranges from 0 to 20 mole % of the total isocyanate compounds.

Examples of isocyanate compounds used for improvement of optical properties include the following compounds: 1,2-diisocyanatobenzene, 1,3-diisocyanatobenzene, 1,4-diisocyanatobenzene, 4,4'-diisocyanatobiphenyl, 1,2-disocyanatomethylbenzene, 1,3-diisocyanatomethylbenzene, 4,4'-diisocyanatophenylmethane, 4,4'-diisocyanatomethylphenylmethane, tolylene diisocyanate, 2,5-diisocyanato-1,4-dithiane, 2,5-diisocyanatomethyl-1,4-dithiane, bis(4-isocyanatocyclohexyl)methane, isophorone diisocyanate, 2,4,6-triisocyanato-1,3,5-triazine, 2,5-bis-(isocyanatomethyl) bicyclo {2,2,1}heptane, and 2,6-bis-(isocyanatomethyl) bicyclo {2,2,1}heptane. The amount of the monomer suitably ranges from 0 to 50 mole % of the total isocyanate compounds.

The molar ratio of compounds contained in a starting monomer mixture [(isocyanate group)/(mercapto group+hydroxyl group)]is suitably adjusted to from 0.90 to 1.10, preferably from 0.95 to 1.05 because the amount of the unreacted functional groups in the resulting polymer is minimized.

The polymer of the invention may optionally, contains an additive such as a ultraviolet light absorber, an antioxidant, a coloring inhibitor or a fluorescent dye for the purpose of improvement of weatherability. In some cases, the use of a catalyst such as organic tin compounds or amine compounds is effective to the improvement of polyaddition reactivity.

The present invention also relates to an optical product using the above polymer of the invention. Examples of the optical product include a lens for eye glasses, an optical lens such as a lens for a camera, a prism, an optical fiber, a substrate for recording information and a filter.

Among the above products, a lens for eye glasses is produced by cast molding of a mixed solution containing 2,5-dimercaptomethyl-1,4-dithiane and 1,3,5-triisocyanatomethylcyclohaxane and optionally a monomer(s) for the sub-skeletons using a pair of glass molds interposing a gasket. Alternatively, the lens is prepared by bulk polymarization of the above mixed solution, and cutting and abrasion of the resulting bulk polymer. It is suitable to add a mold release agent such as a fluoro surfactant, a silicone surfactant, an acidic phosphate or a higher fatty acid as an internal additive to the mixed solution in the amount of, for example, from 50 to 10000 ppm for the improvement of releasability of the polymer from the molds.

The resulting lens may be dyed with a dispersion dye and the like. To increase a temperature of a dying bath or addition of a carrier such as benzylalcohol is effective to accelarate the dying rate. It is also possible to provide a hard coat made of antimony oxide on the surface of the lens by dipping the lens into a antimony oxide sol and heating the lens.

The polymer of the present invention has good transparency, high refractive index, high Abbe's number, and good weatherability. Thus the polymer is useful as an optical material used for a lens, a prism, a fiber, a substrate for optical disk and a filter. The plastic lens obtained from the polymer has good degree of surface accuracy and good optical properties, and is light and has high-impact properties. Thus the lens is especially suitable for a eye glass lens and a camera lens.

Examples

The present invention will be illustrated in detail in reference to Examples below:

Measurement of Physical Properties

Physical properties of the polymers obtained in the following examples are measured as follows:

Appearance

The appearance of each sample is observed by the naked eye, and a sample being completely colorists and transparent is indicated (◯) and a sample not being colorless or transparent is indicated (x).

Refractive Index ($N_D$) and Abbe's Number ($v_D$)

Refractive index ($N_D$) and Abbe's number ($v_D$) are measured by the use of an Abbe's refractometer 3T (available from Atago Co. in Japan) at 20° C.

Weatherability

Color of a lens exposed to light from a sunshine carbon arc lamp in a weathermeter for 200 hours is compared with that of a non-exposed lens. Estimation standard is as follows:
◯: Not changed in color
Δ: Slightly colored with yellow
x: Turned to yellow Thermostability (Measurement of Second-Order Transition Point)

A second-order transition point was estimated from the peak temperature obtained by the TMA measurement with a TMA apparatus (available from RIGAKU CO. in Japan) using a pin (2mm $\phi$) and weighting 10 gf of load.

Optical Distorsion

The naked eye observation by the Schrielen method was conducted and the results are indicated as follows:
◯: No distorsion
x: With distorsion

Example 1

0.3 mol of 2,5-dimercaptomethyl-1,4-dithan (indicated as DMMD in Table 1), 0.2 mol of 1,3,5-triisocyanatomethylcyclohexane (indicated as TIMCH in Table 1), $1 \times 10^{-4}$ mol of dimethyl tin dichloride (a catalyst) and 1000 ppm of acidic phoshate (a mold parting agent) (a mixture of monobutoxy acid phosphate and di(butoxyethyl) acid phosphate) were mixed to obtain a homogeneous mixture. After deaeration, the mixture was poured into a pair of lens molds made of glass. The molds were heated from 40° C. to 120° C. for 25 hours to polymerize the monomers in the mixture to obtain a polymer in the shape of lens. Physical properties of the resulting polymer were listed in Table 1. As seen from Table 1, the polymer was colorless and transparent, and exhibited 1.63 of refractive index ($N_D$) and 40 of Abbe's number. The second-order transition point of the polymer was 140° C., the resulting lens had good thermostability and weatherability and did not have optical distorsion. The IR spectrum of the polymer is shown in FIG. 1. In the spectrum, the absorption of thiourethane bonds was identified at 3300, 1650, 1190 and 1150 cm$^{-1}$.

Examples 2-7

In accordance with the same procedures as those of Example 1, excepting that starting materials shown in Table 1 were used, polymers in the lens shape were obtained. In every sample, the resultant polymer was colorless and transparent, and had 1.63 or more of high refractive index and 36 to 41 of high Abbe's number. Further, the second-order transition point was 100° C. or more and therefore, the polymer had good thermostability as well as good weatherability. The polymer did not have optical distorsion. The absorption of thiourethane bonds was identified at 3300, 1650, 1190 and 1150 cm$^{-1}$; in the IR spectrum of the each polymer.

Comparative Examples 1 and 2

In accordance with the same procedures as those of Example 1, excepting that starting materials shown in Table 1, were used, lens shaped polymers were obtained. Although the resulting polymers were transparent, one or more of the refractive index, the Abbe's number and the thermostability of the polymers were lower than those of the polymers obtained in the above examples. For example, the polymer of Comparative Example 1 exhibited 1.66 of higher refractive index but 32 of lower Abbe's number. The polymer of Comparative example 2 had 36 of higher Abbe's number but 1.59 of lower refractive index.

TABLE 1

| | Monomer Composition (molar ratio) | Appearance | Refractive index ($n_D$) | Abbe's number ($\nu_D$) | Weatherability | Optical distorsion | Second-order transition point (°C.) |
|---|---|---|---|---|---|---|---|
| Example No. | | | | | | | |
| 1 | DMMD/TIMCH = 3.0/2.0 | ◯ | 1.63 | 40 | ◯ | ◯ | 140 |
| 2 | DMMD/TIMCH/XDI = 3.0/1.6/0.6 | ◯ | 1.64 | 38 | ◯ | ◯ | 118 |
| 3 | DMMD/TIMCH/XDI = 3.0/1.2/1.2 | ◯ | 1.65 | 36 | ◯ | ◯ | 118 |
| 4 | DMMD/TIMCH/XDI = 3.0/1.0/1.5 | ◯ | 1.65 | 36 | ◯ | ◯ | 118 |
| 5 | DMMD/TIMCH/H$_6$-XDI = 3.0/1.6/0.6 | ◯ | 1.63 | 41 | ◯ | ◯ | 134 |
| 6 | DMMD/METMP/TIMCH = 2.4/0.4/2.0 | ◯ | 1.63 | 40 | ◯ | ◯ | 115 |
| 7 | DMMD/METMP/TIMCH = 1.8/0.8/2.0 | ◯ | 1.63 | 40 | ◯ | ◯ | 108 |
| Comparative Example No. | | | | | | | |
| 1 | DMMD/XDI = 1.0/1.0 | ◯ | 1.66 | 32 | ◯ | ◯ | 97 |
| 2 | PETMP/XDI 1.0/2.0 | ◯ | 1.59 | 36 | ◯ | ◯ | 87 |

Abbreviation

DMMD: 2,5-dimercapto-1,4-dithiane
TIMCH: 1,3,5-triisocyanatomethylcyclohaxane
XDI: m-xylylene diisocyanate
PETMP: pentaerythritol tetralkismercaptopropionate
H$_6$-XDI: 1,3-bis(isocyanatomethyl)cyclohexane
METMP: 1,2-bis{(2-mercaptoethyl)thio}-3-mercaptopropane

Example 8

Preparation of a Coating Solution 35 parts by weight of γ-glycidoxypropyltrimethoxysilane was added to a glass vessel equipped with a magnetic stirrer, and 2 parts by weight of 0.01N hydrochloic acid aqueous solution and 8 parts by weight of water were added to the vessel with agitation. After the addition, the mixture was stirred for 24 hours to obtain a hydrolyzed product. Then, 100 parts by weight of antimony pentoxide (dispersion in methanol, solids concentration: 30 weight %, average particle diameter: 15 nm), 50 parts by weight of colloidal silica (dispersion in isopropyl alcohol, solids concentration: 30 weight %, average particle diameter: 15 nm), 100 parts by weight of ethyl acetoacetate (solvent), 1 parts by weight of a silicone surfactant (lubricant) and 3 parts by weight of aluminum acetylacetonate (curing agent) were added to the hydrolyzed product and stirred thoroughly followed by filtration to obtain a coating solution.

Formation of Cured Film

The lens shaped polymer obtained in Example 3 (substrate) was dipped into 10% NaOH aqueous solution at 45° C. for 5 minutes and washed thoroughly. The above coating solution was coated on the substrate by the dipping method (lifting speed: 14 cm/min) and heated at 120° C. for 3 hours to form a cured film. The resuling substrate with cured film had good scuff resistance, good adhesion and high impact properties.

Reference Example

Synthesis of 2,5-dimercaptomethyl-1,4-dithiane 22.9g (0.157 mol) of diallyldisulfide was dissolved in 780 mol of dichloromethane, and 25.0 g (0.57 mol) of bromine was added dropwise to the dichloromethane solution at −78° C. for 1 hour. Then the solution was heated to −20° C. and stirred at the same temperature for 8 hours. Then dichloromethane was removed under reduced pressure. 100 ml of ethanol and 23.9 g (0.314 mol) of thiourea were added to the residue and refluxed for 1.5 hours. The produced precipitate was separated from the refluxed mixture by filtration and washed with ethanol several times followed by drying. The precipitate was dispersed in 73 ml of water. Then 64.2 g of 15% aqueous sodium hydroxide solution was added dropwise to the dispersion for 1 hour under reflux condition and a nitrogen atmosphere followed by reflux for 1 hour. After cooling, the reaction mixture was acidified with 6N-hydrochloic acid and subjected to extraction with benzene. The benzene was removed from the extract under reduced pressure. The residue was distilled at $2 \times 10^{-2}$ mmHg to obtain 22.6 g of the fraction with 121.5° C. of boiling point (yield: 68%). The refractive index of the compound in the fraction was 1.64 and the Abbe's number was 35.2. Physico-chemical properties of the compound were as follows:

Elemental Analysis
Calculated (%) C: 33.9, H: 5.65, S: 60.4;
Found (%) C: 33,8, H: 5,80, S: 60.0.

$^1$H-NMR(solvent: CDCl$_3$, internal standard material: TMS)

σ(ppm)=1.62(t,1H), 2.88–3.14(m,5H)

IR 2545 cm$^{-1}$ ($\nu_{SH}$ of thiol)

What we claim is:

1. A polymer used for optical products wherein the polymer comprises 2,5-dimethyl-1,4-dithiane skeletons represented by formula (1):

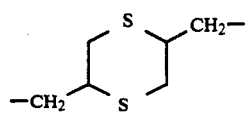

and 1,3,5-trimethylcyclohexane skeletons represented by formula (2):

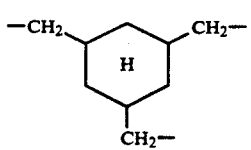

and a part of or all of bonds between the 2,5-dimethyl-1,4-dithiane skeleton and the 1,3,5-trimethylcyclohexane skeleton are thiourethane bonds.

2. The polymer of claim 1 wherein the molar ratio of the 2,5-dimethyl-1,4-dithiane skeletons: the 1,3,5-trimethylcyclohexane skeletons is approximately 3:2, and the bonds between the 2,5-dimethyl-1,4-dithiane skeleton and the 1,3,5-trimethylcychohexane skeleton are thiourethane bonds.

3. The polymer of claim 1 wherein the molar ratio of the 2,5-dimethyl-1,4-dithiane skeletons the 1,3,5-trimethylcyclohexane skeletons is 3.2 to 2.8:2, and the bonds between the 2,5-dimethyl-1,4-dithiane skeleton and the 1,3,5-trimethylcyclohexane skeleton are thiourethane bonds.

4. The polymer of claim 1 wherein the polymer comprises one or more kind of sub-skeletons Other than the 2,5-dimethyl-1,4-dithiane and 1,3,5-trimethylcyclohexane skeletons, and bonds between the sub-skeleton and the 2,5-dimethyl-1,4-dithiane or 1,3,5-trimethylcyclohexane skeleton are thiourethane or urethane bonds.

5. The polymer of claim 4 wherein the content of the sub-skeletons derived from thiols or alcohols is 50 mole % or less of the sum of the 2,5-dimethyl-1,4-dithiane skeletons and said sub-skeletons.

6. The polymer of claim 4 wherein the content of the sub-skeletons derived from isocyanates is 50 mole % or less of the sum of the 1,3,5-trimethylcyclohexane and said sub-skeletons.

7. The polymer of claim 4 wherein the polymer exhibits 1.63 or more of refractive index and 35 or more of Abbe's number.

8. The polymer of claim 1 wherein the polymer exhibits 1.63 or more of refractive index, 35 or more of Abbe's number and 100° C. or more of second-order transition point.

9. A process for preparation of a polymer used for optical products comprising polyaddition of 2,5-dimercaptomethyl-1,4-dithiane and 1,3,5-triisocyanatomethylcyclohexane.

10. The process of claim 9 wherein the polyaddition is carried out in the presence of a catalyst.

11. The process of claim 10 wherein the catalyst is an organic tin compound.

12. The process of claim 9 wherein the molar ratio of 2,5-dimercaptomethyl-1,4-dithiane: 1,3,5-triisocyanatomethylcyclohexane is approximately 3:2.

13. The process of claim 9 wherein the polyaddition is conducted in the presence of at least one member selected from the group consisting of bifunctional or trifunctional alcohols, thiols and isocyanates.

14. The process of claim 13 wherein the amount of the bifunctional or trifuctional alcohols and thiols is equal to or less than that of 2,5-dimercaptomethyl-1,4-dithiane.

15. The process of claim 13 wherein the amount of the bifunctional or trifuctional isocyanates is equal to or less than that of 1,3,5-triisocyanatomethylcyclohexane.

16. The process of claim 13 wherein the polyaddition is carried out in the presence of a catalyst.

17. The process of claim 13 wherein the catalyst is an organic tin compound.

18. An optical product using the polymer of claim 1.

19. The optical product of claim 18 wherein the product is a lens for eye glasses, an optical lens, a prism, an optical fiber or a substrate for recording information.

20. The polymer of claim 1 wherein the polymer comprises 2,5-dimercaptomethyl-1,4-dithiane skeletons and 1,3,5-triisocyanatomethylcyclohexane skeletons.

* * * * *